(12) United States Patent
Singh et al.

(10) Patent No.: US 10,447,731 B2
(45) Date of Patent: Oct. 15, 2019

(54) EMAIL ADDRESS FARMING MITIGATION

(71) Applicant: Microsoft Technology Licensing, LLC, Redmond, WA (US)

(72) Inventors: Deepak Kumar Singh, Redmond, WA (US); Sabitha Abraham, Bellevue, WA (US); Patrick Tousignant, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 15/606,341

(22) Filed: May 26, 2017

(65) Prior Publication Data
US 2018/0343282 A1 Nov. 29, 2018

(51) Int. Cl.
*H04L 29/06* (2006.01)
*H04L 12/58* (2006.01)

(52) U.S. Cl.
CPC ......... *H04L 63/1466* (2013.01); *H04L 51/12* (2013.01); *H04L 51/28* (2013.01); *H04L 63/0414* (2013.01); *H04L 63/08* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,829,636 B1 | 12/2004 | Kubik et al. | |
| 6,836,762 B2 | 12/2004 | Speicher | |
| 7,305,445 B2* | 12/2007 | Singh | G06Q 10/107 709/206 |
| 7,849,142 B2* | 12/2010 | Clegg | H04L 51/12 709/206 |
| 7,917,593 B1 | 3/2011 | Lee | |
| 8,060,569 B2* | 11/2011 | Bolinger | G06F 21/554 709/206 |
| 8,601,064 B1* | 12/2013 | Liao | H04L 51/12 709/206 |
| 2003/0200265 A1 | 10/2003 | Henry | |
| 2006/0168017 A1* | 7/2006 | Stern | G06Q 10/107 709/206 |
| 2006/0212522 A1 | 9/2006 | Walter et al. | |
| 2007/0180039 A1 | 8/2007 | Sutidze et al. | |
| 2008/0109448 A1 | 5/2008 | Aboel-nil et al. | |
| 2008/0294728 A1 | 11/2008 | Batthish et al. | |
| 2009/0089877 A1* | 4/2009 | Bolinger | G06F 21/554 726/22 |

(Continued)

OTHER PUBLICATIONS

Wang, et al., "Secure Channel Injection and Anonymous Proofs of Account Ownership", In Proceedings of 36th Annual International Cryptology Conference, Aug. 14, 2016, 14 pages.

*Primary Examiner* — Jeffery L Williams

(57) ABSTRACT

Systems, methods, apparatuses, and software for electronic mail systems and service in computing environments are provided herein. In one example, an email service is provided that receives receive requests for endpoint information that correspond to email identities included in the requests. For ones of the requests that indicate invalid email identities, the email service determines responses that conceal validity of the invalid email identities by deriving target endpoint information based at least on the invalid email identities, and provides the responses that indicate the target endpoint information.

20 Claims, 4 Drawing Sheets

(56) References Cited

U.S. PATENT DOCUMENTS

| | | | |
|---|---|---|---|
| 2009/0103702 A1* | 4/2009 | Allen | H04L 9/3236 379/142.04 |
| 2013/0160123 A1* | 6/2013 | Wood | H04L 51/12 726/23 |
| 2015/0100655 A1 | 4/2015 | Pouzin et al. | |
| 2018/0343282 A1* | 11/2018 | Singh | H04L 63/1466 |

* cited by examiner

EMAIL ADDRESS FARMING MITIGATION

TECHNICAL BACKGROUND

Networked messaging platforms have become popular for transferring communications between users, such as electronic mail (email), instant messaging, text messaging, or other messaging technologies. These messaging platforms can be provided for end users to draft or compose various messages and create conversation-threaded communications for interaction with one or more users. Users can interact with the messaging systems through graphical interfaces and user applications that are employed on smartphones, computers, laptops, tablets, gaming systems, and the like.

The networked messaging platforms typically use standardized identities, such as email addresses in the "local-id@domain" format, to identify users or other entities that are reachable through the messaging platforms as well as indicating a corresponding server, organization, or service. Malicious entities can attempt to 'farm' these identities by trying random combinations of the identities and observing the resultant activity of the messaging platforms. Based on differences in how the various random identities are handled, the malicious entities may be able to glean which identities are valid and which are invalid. Various potentially undesirable activity can commence based on perceived validity of the identities, such as spam emailing, phishing attacks, as well as various hacking or unauthorized activity.

OVERVIEW

Systems, methods, apparatuses, and software for electronic mail systems and service in computing environments are provided herein. In one example, an email service is provided that receives receive requests for endpoint information that correspond to email identities included in the requests. For ones of the requests that indicate invalid email identities, the email service determines responses that conceal validity of the invalid email identities by deriving target endpoint information based at least on the invalid email identities, and provides the responses that indicate the target endpoint information.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 2:
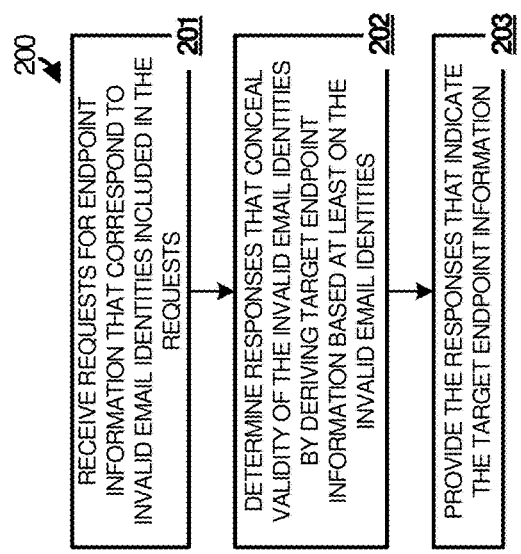
FIG. 2 illustrates a validity obfuscation process in an implementation.

Networked messaging platforms, such as electronic mail (email) systems, instant messaging platforms, text messaging, or other messaging technologies, allow one or more users to compose various messages and communications for interaction with one or more users. Users and client systems can send and receive many messages with other users that might be spread over a large geographic area, such as different countries and regions across the globe. Standardized identities are typically employed, such as email addresses in the "local-id@domain" format (i.e. john@contoso.com), to identify users or entities that are reachable through the messaging platforms as well as indicating a corresponding server, organization, or service.

These networked messaging platforms, such as Microsoft Exchange®, can be architected into various structural arrangements. The arrangements can include purely 'online' environments, such as web-based, cloud-hosted, or distributed computing-hosted environments. These arrangements can include on-premises arrangements where customers or organizations have physical or virtual machines on-site at various locations. These arrangements can also include hybrid arrangements where both online or hosted environments and on-premises environments are employed.

Various discovery features have been incorporated into networked email platforms to aid end users and client systems to find locations or addresses of associated endpoints that serve the end users and client systems. The associated endpoints can provide authentication services and, once authentication has completed, provide messaging services to the end users and client systems. This discovery and authentication process, when employed in an email platform, can aid in the discovery of mailbox locations for the end users and client systems. Some example authentication services include Microsoft Windows® NT LAN Manager (NTLM) or Microsoft Kerberos protocols, as well as various other certificate authority services. However, many of these authentication processes first rely upon discovering a location or address of an endpoint that can service authentication requests, such as a mailbox location for a client system to interface. A challenge for these and other discovery mechanisms include 'farming' of user/client identities, such as email addresses. Once farmed, these user/client identities might be abused for spam, hacking, or other unauthorized or undesired activities.

In the examples below, for an incorrect user identity provided by a requestor, an obfuscation service implements various logic and processes to return responses that confound any potential identity farming activities. However, if invalid information is provided in these responses, then meta-analysis performed by the farming entities might determine validity of the user identities, thwarting the anti-farming techniques. Thus, in the examples below, the enhanced obfuscation services return valid endpoint information for invalid user identities to prevent farming of the user identities, among other activities. Using these enhanced services, a farmer entity will not be able to determine validity for the user identities being requested. For example, a farmer entity would always feel like a proper or correct endpoint has been returned in response to a requested user identity.

Technical effects include increased network security and user/client privacy, decreased network loading based on unsolicited (spam) messaging, prevention of unauthorized access to messaging services, prevention of unauthorized access to user identity or email identity validity, and more efficient usage of endpoint or mailbox computing/processing resources by not having to service unsolicited messaging traffic, among other improvements and technical effects. Further technical effects can include decreased usage of communication networks.

Figure 1:
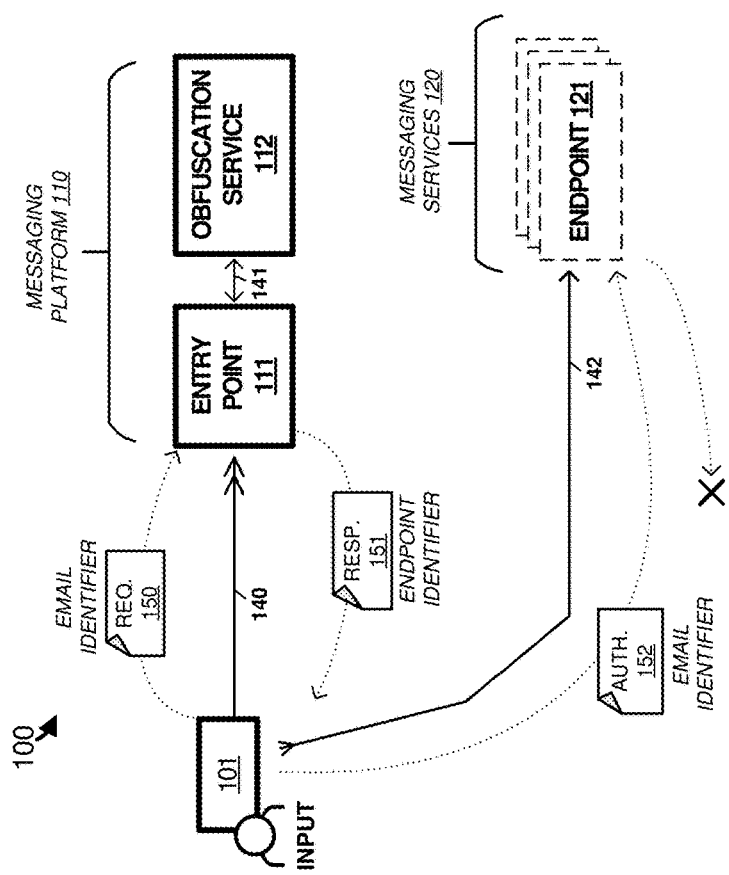
FIG. 1 illustrates a messaging environment in an implementation.

As a first example of enhanced network messaging, FIG. 1 is presented. FIG. 1 is a system diagram that includes network messaging environment 100. Environment 100 includes requesting system 101, messaging platform 110, and messaging services 120. Requesting system 101 and messaging platform 110 communicate over link 140. Requesting system 101 and messaging services 120 communicate over link 142. Messaging platform 110 includes entry point 111 and obfuscation service 112 which communicate over link 141.

In operation, requesting system 101 issues one or more requests 150 over link 140 that are received by entry point 111. These requests typically indicate user identities or client identities, such as email addresses or other information. Entry point 111 can determine validity of the requested identities, such as by consulting various data stores, databases, or other associated data structures. Based on the validity of the requested identities, entry point 111 might employ obfuscation service 112 to obfuscate or conceal the validity of the requested identity by determined one or more endpoints that should be included in responses to the requests. Accordingly, entry point 111 provides responses 151 that include the endpoint identifiers, such as network addresses or uniform resource locators (URLs) that identify the endpoints.

Requesting system 101 can then use these endpoint identifiers to locate one or more endpoints 121 among messaging services 120 for further communication. The user or client identifiers are then provided by requesting system 101 (or other systems) to the indicated endpoints for authentication process, such as seen in authentication message 152 that includes an email identifier. Since the email identifier or other user/client identifier will be invalid in this example, the authentication process will fail and no further action need be taken by messaging platform 110 or messaging services 120. Thus, the validity of the user/client identifier (such as email identifier) will be hidden to requesting system 101.

For a further discussion of the enhanced operation of environment 100, FIG. 2 is provided. FIG. 2 includes operations 200 that describe one example operation of environment 100. In FIG. 2, messaging platform 110 receives (201) requests for endpoint information that correspond to invalid email identities included in the requests. In FIG. 1, request 150 can include one or more email identities that correspond to an email address or other user/client identity. The requests can comprise a request for information related to an endpoint that services the included identity. For example, the request can be for a mailbox endpoint address, server name, server address, protocol endpoint designator, or other information that corresponds to the provided email identity.

Responsive to receiving the requests, messaging platform 110 determines (202) responses that conceal validity of the invalid email identities by deriving target endpoint information based at least on the invalid email identities. In FIG. 1, obfuscation service 112 is employed to obfuscate or conceal validity of the email identities. For example, entry point 111 can provide an email identity over link 141 to obfuscation service 112, and obfuscation service 112 can return information related to an endpoint that can be provided to requesting system 101 as corresponding to the email identity.

To obfuscate or conceal the validity of the email identities, obfuscation service 112 can perform one or more operations. These operations include first determining if the email identities are valid or invalid, such as by checking an email identity against membership information for various email or messaging services provided by messaging platform 110. Various databases, member lists, server identity records, or other data structures might be employed to determine validity of the email identities. Valid email identities can be handled normally, and corresponding endpoint information can be returned to the requesting entities. However, when email identities are determined as invalid, then one or more obfuscation processes can be applied to determine an endpoint that should be indicated as corresponding to the invalid email identities.

These obfuscation processes comprise prescribed or algorithmically determined processes that can provide consistent determination of endpoint information for invalid email identities. For example, a hashing process can be employed on the actual email identity or other identity to determine a result. This result can be used to select among a list of endpoint names or protocol endpoint addresses, among other information. Thus, if the same email identity is used more than once in a request, the same or similar endpoint information can be provided to the requesting entity. This consistency can ensure great difficulty for the requesting entity to determine email identity validity based solely on the endpoint information. Moreover, meta-analysis by the requesting entity can be prevented from determination of email identity validity by providing a mix or spread of endpoint responses among different email identities. This spread can ensure that a mix of online, cloud, distributed, and on-premises messaging services can be identified in the endpoint information across different email identities.

Once the endpoint information has been determined for the individual requests, messaging platform 110 provides (203) responses that indicate the target endpoint information that corresponds to the email identities. Since the requesting entities do not glean validity status of the email identities from the responses, the requesting entities might further attempt to use the email identities in authentication processes with the provided endpoint information. The endpoints associated with the endpoint information might include various protocol endpoints, mailbox servers, authentication services, or other entities that can perform login or other authentication processes based on the email identities. Since the endpoint information merely includes network addressing or name information for the endpoints, and does not include authentication information or credentials for the email identities, then the requesting entities cannot successfully complete an authentication for the email identities with the associated endpoints.

In a specific example, requesting system 101 might receive an endpoint network address, protocol endpoint name/address, or server name responsive to the request with the email identity. Requesting system 101 can then attempt to contact the endpoint using the endpoint information and use the email identity to glean further information on the validity of the email identity. The endpoint typically then initiates a login process or authentication process using the email identity as a username or login name However, lacking further credentials, such as a password, requesting system 101 cannot successfully authenticate or login. Thus, no further validity information can be determined by requesting system 101 due to the authentication process. Any attempted email identity farming is prevented.

Returning to a discussion of the elements of FIG. 1, requesting systems 101 can comprise any number of end user systems, such as terminals, computing devices, tablet devices, smartphones, personal computers, servers, cloud-based systems, distributed computing platforms, and the like. Users of a communication platform or automated systems, can compose, transfer requests, and receive responses, such as email identity requests or endpoint information requests. Requesting systems 101 each include one or more network interfaces, such as network interface cards, wireless interfaces, optical networking interfaces, and the like, over which requests and communication sessions can be initiated. Requesting systems 101 can include hardware and software elements to interface with a certificate platform using web interfaces, terminal interfaces, console interfaces, shell interfaces, APIs, graphical user interface, textual user interface, among other user interfaces, including combinations thereof. In some examples, requesting systems 101 comprise scripted, robotic, or otherwise automated systems that repeatedly perform predetermined processes to farm email identities or otherwise glean email identity validity from messaging platform 110. These automated systems can comprise applications, virtualized app containers, scripting software, email identifier databases, among other elements.

Messaging platform 110 includes one or more instances of entry point 111 and obfuscation service 112, among other elements. Messaging platform 110 comprises server based or distributed computing based messaging services and platforms, such as email messaging platforms, chat platforms, or instant messaging platforms, among others. Messaging platform 110 can include communication interfaces, network interfaces, processing systems, computer systems, microprocessors, storage systems, storage media, or some other processing devices or software systems, and can be distributed among multiple devices or across multiple geographic locations. Examples of messaging platform 110 can include software such as an operating system, logs, databases, utilities, drivers, networking software, and other software stored on a computer-readable medium. Messaging platform 110 can comprise one or more platforms which are hosted by a distributed computing system or cloud-computing service. Messaging platform 110 can comprise logical interface elements, such as software defined interfaces and Application Programming Interfaces (APIs). Messaging platform 110 can include one or more user interfaces, such as graphical user interfaces, web interfaces, APIs, terminal interfaces, console interfaces, command-line shell interfaces, extensible markup language (XML) interfaces, among others.

Messaging services 120 include one or more endpoints 121, among other elements. Messaging services 120 comprise server based or distributed computing based messaging services and platforms, such as email messaging platforms, chat platforms, or instant messaging platforms, among others. Messaging services 120 can include communication interfaces, network interfaces, processing systems, computer systems, microprocessors, storage systems, storage media, or some other processing devices or software systems, and can be distributed among multiple devices or across multiple geographic locations. Examples of messaging services 120 can include software such as an operating system, logs, databases, utilities, drivers, networking software, and other software stored on a computer-readable medium. Messaging services 120 can comprise one or more platforms which are hosted by a distributed computing system or cloud-computing service. Messaging services 120 can comprise logical interface elements, such as software defined interfaces and Application Programming Interfaces (APIs). Messaging services 120 can include one or more user interfaces, such as graphical user interfaces, web interfaces, APIs, terminal interfaces, console interfaces, command-line shell interfaces, extensible markup language (XML) interfaces, among others.

Endpoints 121 comprise one or more servers, and can include various elements discussed above for messaging services 120. In some examples, endpoints 121 comprise protocol endpoints for a messaging services, such as mailbox endpoints, mailbox servers, or other entities. Endpoints 121 can each be associated with particular endpoint information, such as network addresses, server addresses, hostnames, domains, or other network identification or network location information.

Links 140-142 can each comprise one or more communication links, such as one or more network links comprising wireless or wired network links. Links 140-142 can comprise various logical, physical, or application programming interfaces. Example communication links can use metal, glass, optical, air, space, or some other material as the transport media. Links 140-142 can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. Links 140-142 can include direct links or may include intermediate networks, systems, or devices, and can include a logical network link transported over multiple physical links. Links 140-142 can include routers, switches, bridges, traffic handling nodes, and the like for transporting traffic among endpoints.

Figure 3:
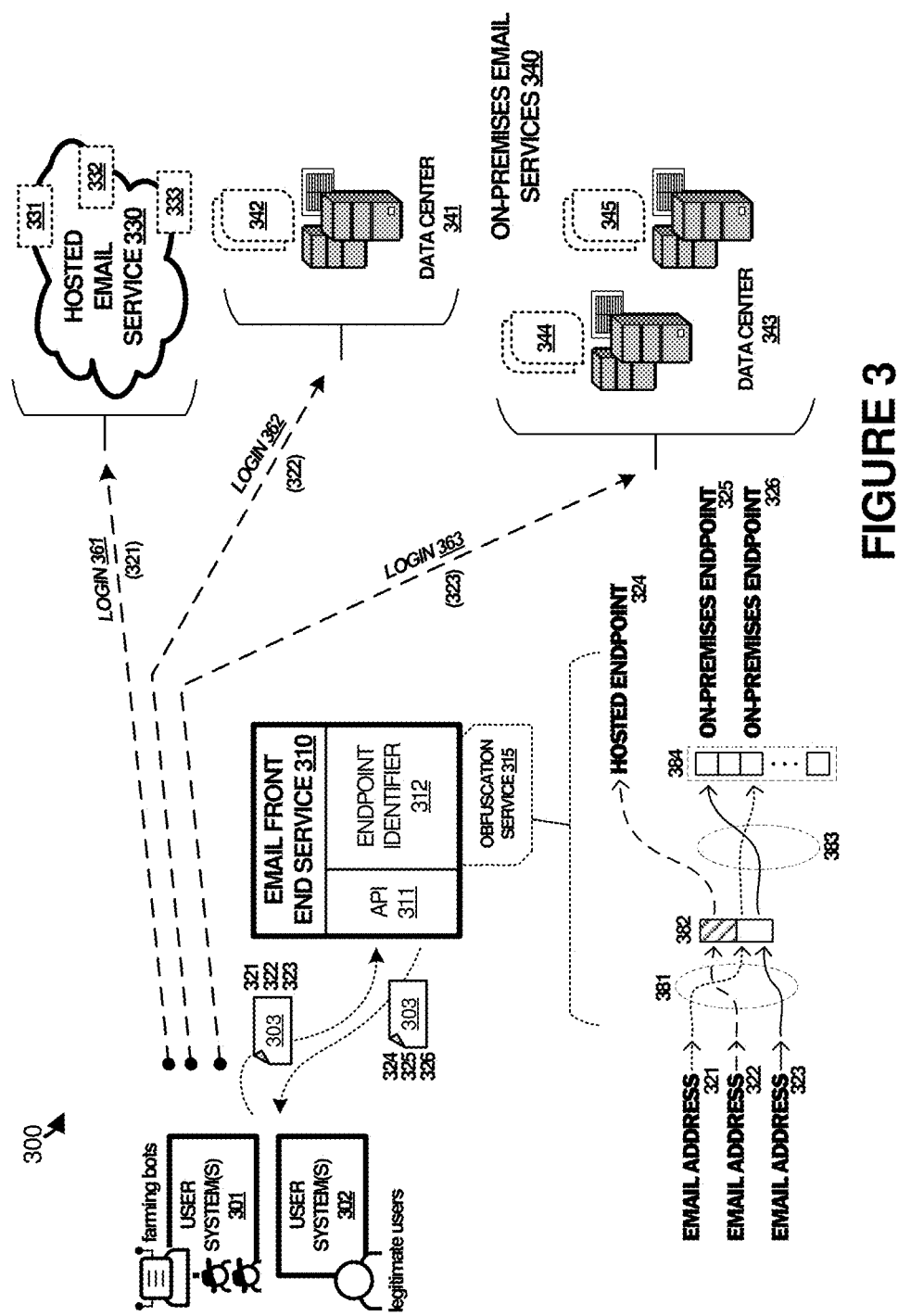
FIG. 3 illustrates an email environment in an implementation.

Turning now to further example systems and environments that employ validity obfuscation processes, FIG. 3 is presented. FIG. 3 is a system diagram illustrating email environment 300. Environment 300 includes email front-end service 310, which further includes application programming interface (API) 311 and endpoint identifier 312. Environment 300 also includes one or more client or user systems 301-302, which can include a mixture of legitimate users and email address 'farming' bots or nefarious users. Environment 300 also includes hosted email service 330 and on-premises email services 340. Elements of environment 300 can be implemented using various hardware, software, and virtualized elements, such as those detailed in FIG. 1 and FIG. 6, although variations are possible.

Figure 5:
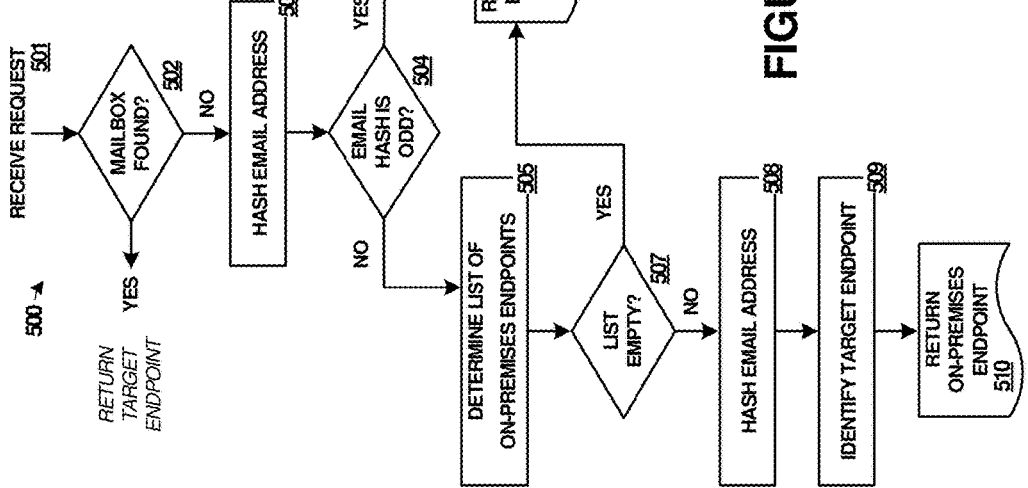
FIG. 5 illustrates a validity obfuscation process in an implementation.
Figure 4:
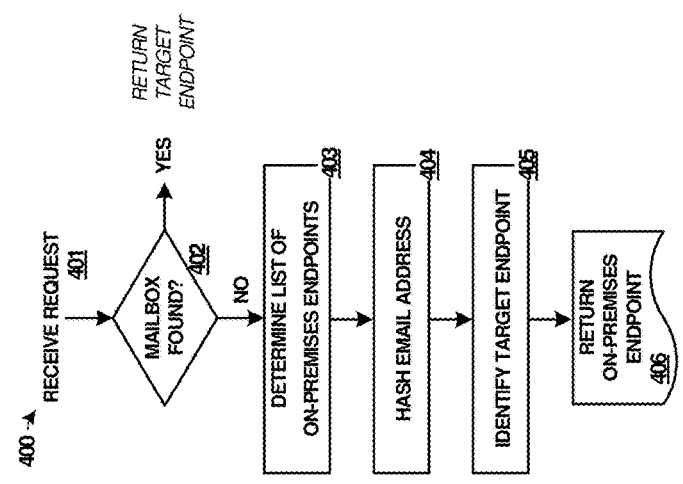
FIG. 4 illustrates a validity obfuscation process in an implementation.

FIGS. 4 and 5 illustrate example operations for the elements of environment 300, with FIG. 4 describing an example operation 400 of an email environment comprising on-premises email systems, and with FIG. 5 describing an example operation 500 of a hybrid email environment comprising both hosted email systems and on-premises email systems. The operations of FIGS. 4 and 5 can be performed by various elements of environment 300, such as email front end service 310, among other elements.

In FIG. 4, requests 303 are received (401) by front end service 310, such as over API 311. These requests can comprise requests for endpoint information related to email addresses 324, 325, 326 indicated in the requests. The endpoint information comprises network addressing information or protocol endpoint information that allows a client system or end user to reach a mailbox that is associated with the email addresses included in the requests.

In a system that does not include the enhanced operation described herein, invalid email addresses might prompt different externally-visible behavior than valid email addresses. Thus, user systems 301-302 might be able to tell active or valid email addresses from inactive or invalid email addresses. This validity information can be used to send unauthorized emails to the valid email addresses while ignoring the invalid email addresses. Other unauthorized or undesired activity can also occur from the knowledge of which email addresses are valid or not. However, in the examples herein, an enhanced operation is provided where requesting entities, such as end users, farming bots, or hacking entities cannot determine which email addresses are valid and which are invalid, preventing spam emails or other undesired activity.

First, a check (402) is performed to see if a mailbox or account is valid for the email addresses received in requests 303. This is a validity check to determine if the email addresses are valid or invalid, active or inactive, or other determinations that indicate if the email addresses are to be handled as legitimate email addresses or otherwise. If the email addresses are valid, then a proper corresponding target endpoint can be returned in response to the requests issued for those email addresses, and users or clients can receive the endpoint information to perform normal email tasks (i.e. checking email, sending/receiving email, and the like). In FIG. 3, endpoint identifier 312 can determine validity among the email addresses, and return endpoint information to requesting entities.

However, if the email addresses are not valid, then an obfuscation process is performed. This obfuscation process can be performed by obfuscation service 315, and initiated by endpoint identifier 312 responsive to detecting invalid email addresses. Obfuscation process 315 can perform various operations depending upon the type of email system affected by the email addresses or the type of email system managed by front end service 310. In FIG. 4, the type of email system is a fully on-premises style of email system, where customers or email administrators have one or more on-site email systems that can be included over many physical/geographic sites to handle email activities for those sites. These on-premises systems can include various server hardware that is located at the different customer sites, as shown in FIG. 3 for on-premises email services 340. Each of the on-premises email systems can have one or more mailbox endpoints associated therewith, as noted in FIG. 3 by elements 342, 344, and 345.

Obfuscation service 315 determines (403) a listing of these on-premises style of mailbox endpoints, and performs (404) an algorithmically-driven process, such as hashing process, to spread selection of the endpoints among members of that list. The hashing process is shown in FIG. 3 for hash 383 and result 384. Hash 381 and result 382 can also be applied, but are more applicable to the operations of FIG. 5 below. The entire contents of the email addresses are hashed individually, so that a typical email address "local_id@domain" is hashed to determine a result. A modulo or remainder of the hashing process can be used to select an endpoint among the list of on-premises endpoints. In this way, a particular email address (e.g. john@contoso.com) will consistently return the same endpoint after the hashing process is performed. Once the target endpoint for each invalid email address is identified (405), then front end service 310 can return corresponding endpoint information 325, 326 to the requesting party.

The requesting party might then try to further utilize the endpoint information along with the corresponding invalid email address to determine validity of the email address or execute further operations with the obtained information. For example, FIG. 3 illustrates two on-premises login attempts 362, 363 using invalid email addresses 325, 326 along with the hash-determined endpoint information 325, 326. These login attempts will typically fail to be authorized by data centers 341 and 343 due to lack of full credentials for the email addresses, such as passwords or other credentials. However, even with the failed login attempts using the invalid email addresses at the legitimate endpoints at data centers 341 and 343, the requesting entities cannot determine validity of the email addresses. Thus, the requesting entities (such as farming bots) cannot determine validity of email addresses with respect to the email systems provided in FIG. 3.

Turning now to a hybrid email system scenario, FIG. 5 illustrates example operations 500. In FIG. 5, requests 303 are received (501) by front end service 310, such as over API 311. These requests can comprise requests for endpoint information related to email addresses 324, 325, 326 indicated in the requests. The endpoint information comprises network addressing information or protocol endpoint information that allows a client system or end user to reach a mailbox that is associated with the email addresses included in the requests.

In a system that does not include the enhanced operation described herein, invalid email addresses might prompt different externally-visible behavior than valid email addresses. Thus, user systems 301-302 might be able to tell active or valid email addresses from inactive or invalid email addresses. This validity information can be used to send unauthorized emails to the valid email addresses while ignoring the invalid email addresses. Other unauthorized or undesired activity can also occur from the knowledge of which email addresses are valid or not. However, in the examples herein, an enhanced operation is provided where requesting entities, such as end users, farming bots, or hacking entities cannot determine which email addresses are valid and which are invalid, preventing spam emails or other undesired activity.

First, a check (502) is performed to see if a mailbox or account is valid of the email addresses received in requests 303. This is a validity check to determine if the email addresses are valid or invalid, active or inactive, or other determinations that indicate if the email addresses are to be handled as legitimate email addresses or otherwise. If the email addresses are valid, then a proper corresponding target endpoint can be returned in response to the requests issued for those email addresses, and users or clients can receive the endpoint information to perform normal email tasks (i.e. checking email, sending/receiving email, and the like). In FIG. 3, endpoint identifier 312 can determine validity among the email addresses, and return endpoint information to requesting entities.

However, if the email addresses are not valid, then an obfuscation process is performed. This obfuscation process can be performed by obfuscation service 315, and initiated by endpoint identifier 312 responsive to detecting invalid email addresses. Obfuscation process 315 can perform various operations depending upon the type of email system affected by the email addresses or the type of email system managed by front end service 310. In FIG. 5, the type of email system is a hybrid style of email system, where customers or email administrators have one or more on-site email systems, as well as one or more online or 'hosted' email systems. The on-site email systems can be included over many physical/geographic sites to handle email activities for those sites. The hosted email systems are indicated by hosted email service 330 with mailbox endpoints 331-333. Each of the on-premises email systems can have one or more mailbox endpoints associated therewith, as noted in FIG. 3 by elements 342, 344, and 345.

Obfuscation service 315 determines (503) a listing of these hosted and on-premises style of mailbox endpoints, and performs a multi-step hashing process. The first hashing process includes an odd/even determination. In hashing process 381 and result 382, contents of the email addresses are hashed (504) in an algorithmically-driven process to spread selection of the endpoints among hosted and on-premises mailbox endpoints. In some examples, the email addresses might contain a domain name or host name that is handled by a particular hosted email service, such as outlook.com or the like. This can prompt alteration of this first hashing process, as mailbox endpoints associated with the particular domain/host name might instead be selected among instead of a selection among on-premises and hosted. As mentioned, the entire email address can be hashed to determine a result, such as a remainder or modulo, which can be used to make an odd/even determination among hosted/on-premises.

If an 'odd' result is determined after hashing process 381, then a hosted email system might be selected, and if an 'even' result is determined, then an on-premises system might be selected. The 'odd' or 'even' designations can vary or be reversed in some examples. When the hosted email system is selected, then obfuscation service 315 can return (506) indicators of one or more endpoint identifiers 324 of the hosted email system. These endpoint indicators can be used in responses by front end service 310. When the 'even' result indicates an on-premises system is selected, then a further secondary hashing process 383 is performed.

Before the secondary hashing process occurs, obfuscation service 315 in conjunction with endpoint identifier 312, might first determine if any on-premises endpoints are available to service subsequent authentication requests (505) and if none are listed or available, then obfuscation service 315 can return (506) indicators of one or more endpoints of the hosted email system.

However, assuming there are available on-premises endpoints, then the secondary hashing process (508) is shown in FIG. 3 for hash 383 and result 384. After hash 381 and result 382 are determined and indicate an on-premises system should be selected, then hash process 383 is applied. The entire contents of the email addresses are hashed individually, so that a typical email address "local_id@domain" is hashed to determine a result. A modulo or remainder of the hashing process can be used to select an endpoint among the list of on-premises endpoints, such as the plurality of endpoints indicated in results 384. Once the target endpoint for each invalid email address is identified (509), then front end service 310 can return corresponding endpoint information 325, 326 to the requesting party.

Due to the procedural or algorithmic determination of the endpoint identity for each individual email address, a particular email address (e.g. john@contoso.com) will consistently return the same on-premises endpoint after the hashing process is performed. Moreover, the hashing processes ensure that email addresses can be spread or distributed over a plurality of on-premises endpoints as well as hosted email endpoints, such as in hybrid or on-premises-only systems. The initial odd/even hashing process can be biased to produce more results for the hosted endpoints or for the on-premises endpoints. The secondary hashing process can be biased to produce more results for particular on-premises endpoints. These biases might be selected to distribute loading of the endpoints for later authentication requests or according to operator preferences.

The requesting party might then try to further utilize the endpoint information along with the corresponding invalid email address to determine validity of the email address or execute further operations with the obtained information. For example, FIG. 3 illustrates one hosted email service login attempt 361 using invalid email address 321, and two on-premises login attempts 362, 363 using invalid email addresses 325, 326. The login attempts are directed to the hash-determined endpoints, as indicated by endpoint information 325, 326. These login attempts will typically fail to be authorized by hosted email service 330, and data centers 341 and 343, due to lack of full credentials for the email addresses, such as passwords or other credentials. However, even with the failed login attempts using the invalid email addresses at the legitimate endpoints at hosted email service 330, and data centers 341 and 343, the requesting entities cannot determine validity of the email addresses. Thus, the requesting entities (such as farming bots) cannot determine validity of email addresses with respect to the email systems provided in FIG. 3.

In other examples, the hashing process to select on-premises endpoints might instead comprise different selection process, such as round-robin or next-closest email address selection. In the round-robin selection, the list of endpoints might be rotated among sequentially for each new invalid email address encountered. However, the round-robin selection might allow an email farming entity to determine that the email address is invalid using multiple requests to the same email address. The hashing processes described above ensure that consistent endpoints are identified for individual invalid email addresses, even after multiple requests are made for the same invalid email address. In a next-closest email address selection process, an invalid email address can be compared to another valid email address within a similar domain to determine or select a similar endpoint as the valid email address. Alphabetical or numerical ordering based on the username or local_id portion can be used to select a proximate valid email address to the invalid email address. For example, if a valid email address is john@contoso.com, and an invalid email address is jack@contoso.com, then the contoso.com portion can be used to determine a closest user alphabetically to the 'jack' portion.

In some examples, the request and response process can occur over hypertext transfer protocol (HTTP) or other similar protocols, including variations and improvements thereof. The request can take the form of an HTTP GET request that indicates a user identity or email address. The response can take the form of an HTTP (200) OK response that identifies a URL or server address reachable by the requesting entity, such as: "endpoint_ID. domain.com" or "https://outlook.office.com/" among others.

Advantageously, the examples herein provide for anti-email farming for various networked messaging platforms, email systems, email services, and other services, environments, and platforms used for network messaging. Email farmers can attempt to use random or sequentially-generated email addresses to find valid ones from which to launch spam, hacking attempts, or other unauthorized or undesired activity. However, the examples herein provide for obfuscated validity of email addresses, so that email farming entities have a much more difficult time to determine validity. The hashing processes ensure consistent responses to email addresses or other network identities for which endpoint information is requested, further preventing validity determination by the email farmers using multiple attempts to the same email addresses.

Figure 6:
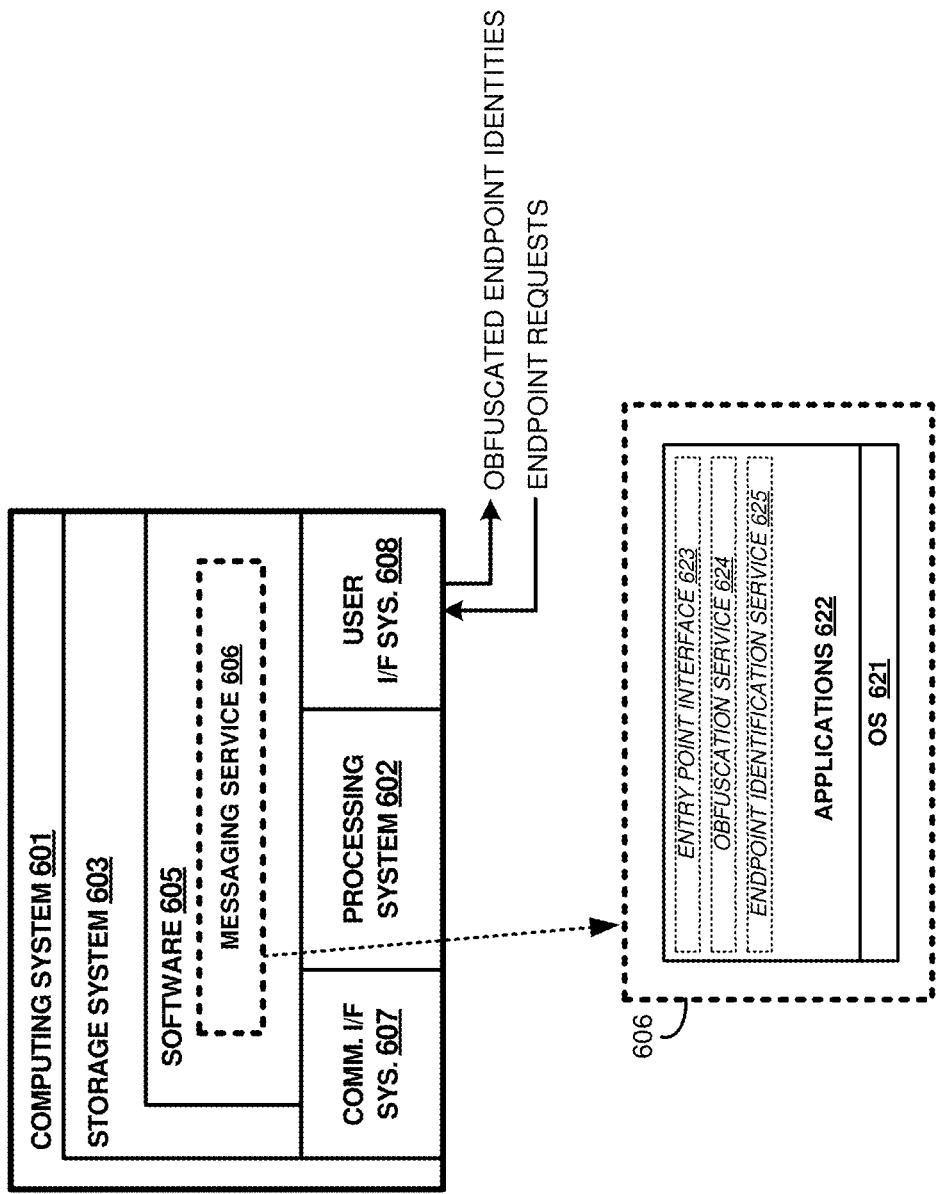
FIG. 6 illustrates a computing system suitable for implementing any of the architectures, processes, and operational scenarios disclosed herein.

FIG. 6 illustrates computing system 601 that is representative of any system or collection of systems in which the various operational architectures, scenarios, and processes disclosed herein may be implemented. For example, computing system 601 can be used to implement any of the elements of FIG. 1, such as entry point 111 or obfuscation server 112 of FIG. 1, or email service 310 of FIG. 3.

Examples implemented by computing system 601 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 601 are implemented on user devices, example devices include smartphones, laptop computers, tablet computers, desktop computers, gaming systems, entertainment systems, and the like.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 608. Processing system 602 is operatively coupled with storage system 603, communication interface system 607, and user interface system 608.

Processing system 602 loads and executes software 605 from storage system 603. Software 605 includes messaging service 606, which is representative of the processes, services, and platforms discussed with respect to the preceding Figures.

When executed by processing system 602 to provide enhanced messaging services, including determining endpoint information related to email identities, obfuscating validity of email identities, and selecting obfuscated endpoints, among other services, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and processing circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced messaging services, including determining endpoint information related to email identities, obfuscating validity of email identities, and selecting obfuscated endpoints, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software or other application software, in addition to or that include messaging service 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to provide enhanced messaging services, including determining endpoint information related to email identities, obfuscating validity of email identities, and selecting obfuscated endpoints, among other services. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Messaging service 606 includes one or more software elements, such as OS 621 and applications 622. Applications 622 can receive user or device input, such as requests for endpoint information, through user interface system 608. Applications 622 can include entry point interface 623, obfuscation service 624, and endpoint identification service 625, or other applications/services which can provide enhanced messaging services, including obfuscated email validity services. These elements can describe various portions of computing system 601 with which a user interacts. For example, OS 621 can provide a software platform on which user application is executed and allows for receipt and monitoring of input from user interface system 608 and delivery of endpoint information and other content over communication interfaces.

User applications 622 can be related to any messaging platform discussed herein, such as productivity, messaging, electronic mail, instant messaging, network chat, network messaging, or other messaging and communication applications, and optionally includes user interface elements which can be manipulated by a user. In one example, entry point interface 623 provides an interface, such as a web interface, programming interface, API, or other interface for interacting with client systems or users. Entry point interface 623 receives requests for endpoint information, such as requests for protocol endpoints or mailbox endpoints associated with messaging identities. Endpoint identification service 625 can determine endpoints and endpoint information for incoming messaging identities, such as for email addresses indicated in mailbox endpoint identification requests. In some cases, the messaging identities will correspond to invalid or non-existent messaging identities, while in other cases the messaging identities will correspond to valid or existent messaging identities. When corresponding to invalid messaging identities, obfuscation service 624 can determine endpoint identities algorithmically to obfuscate responses related to invalid messaging identities, as discussed herein.

Communication interface system 607 may include communication connections and devices that allow for communication with other computing systems (not shown) over communication networks (not shown). Examples of connections and devices that together allow for inter-system communication may include network interfaces, network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 608 can receive input and provide output over a network interface, such as communication interface system 607. In network examples, user interface system 608 might include web interfaces and terminal interfaces. User interface system 608 can packetize display or graphics data for remote display by a display system or computing system coupled over one or more network interfaces or web interfaces. Physical or logical elements of user interface system 608 can provide alerts or visual outputs to users or other operators. User interface system 608 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface. In further examples, user interface system 608 may include a touchscreen, keyboard, mouse, voice input device, audio input device, or other touch input device for receiving input from a user. Output devices such as a display, speakers, web interfaces, terminal interfaces, and other types of output devices may also be included in user interface system 608.

Communication between computing system 601 and other computing systems, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

EXAMPLE 1

A computing apparatus comprising one or more computer readable storage media, a processing system operatively coupled with the one or more computer readable storage media, and program instructions stored on the one or more computer readable storage media. When executed by the processing system, the program instructions direct the processing system to at least receive requests for endpoint information that correspond to email identities included in the requests. For ones of the requests that indicate invalid email identities, the program instructions direct the processing system to determine responses that conceal validity of the invalid email identities by deriving target endpoint information based at least on the invalid email identities, and provide the responses that indicate the target endpoint information.

EXAMPLE 2

The computing apparatus of Example 1, where for each of the responses, the target endpoint information comprises at least one associated endpoint address corresponding to a valid endpoint capable of handling authentication attempts issued for associated ones of the invalid email identities.

EXAMPLE 3

The computing apparatus of Examples 1-2, where responsive to authentication attempts for the invalid email identities issued to endpoints indicated by the target endpoint information, the endpoints prompt for login credentials related to the invalid email identities.

EXAMPLE 4

The computing apparatus of Examples 1-3, comprising further program instructions, when executed by the processing system, direct the processing system to at least determine the responses that conceal the validity of the email identities by at least processing content of the invalid email identities with an endpoint obfuscation process to reduce potential identification of the validity of the email identities while maintaining consistent responses to the requests among each individual invalid email identity.

EXAMPLE 5

The computing apparatus of Examples 1-4, where the endpoint information relates to a hybrid email system comprising a distributed email system and at least one on-premises email system, and comprising further program instructions, when executed by the processing system, direct the processing system to at least determine the responses that conceal the validity of the email identities by at least processing the invalid email identities with at least an obfuscation function to identify the target endpoint information from among the distributed email system and the at least one on-premises email system. Based at least on the obfuscation function indicating the distributed email system, the program instructions direct the processing system to determine associated responses that indicate an endpoint address for the distributed email system, and based at least on the obfuscation function indicating the at least one on-premises email system, determine associated responses that indicate the at least one on-premises email system.

EXAMPLE 6

The computing apparatus of Examples 1-5, comprising further program instructions, when executed by the processing system, direct the processing system to at least, based at least on the at least one on-premises email system comprising a plurality of on-premises email systems, processing the invalid email identities with at least a further obfuscation function to distribute the target endpoint information among the plurality of on-premises email systems.

EXAMPLE 7

The computing apparatus of Examples 1-6, where the endpoint information relates to an email system comprising a plurality of on-premises email systems, and comprising further program instructions, when executed by the processing system, direct the processing system to at least determine the responses that conceal the validity of the email identities by at least processing the invalid email identities with at least an obfuscation function to distribute the target endpoint information among the plurality of on-premises email systems.

EXAMPLE 8

The computing apparatus of Examples 1-7, where the endpoint information relates to an email system comprising a distributed email system, and comprising further program instructions, when executed by the processing system, direct the processing system to at least determine the responses that obfuscate the validity of the email identities by at least providing the valid endpoint information from among the distributed email system responsive to the requests indicating the invalid email identities.

EXAMPLE 9

A method of operating an email service, the method comprising receiving requests for endpoint information that correspond to email identities included in the requests, and for ones of the requests that indicate invalid email identities, determining responses that conceal validity of the invalid email identities by deriving target endpoint information based at least on the invalid email identities, and providing the responses that indicate the target endpoint information.

EXAMPLE 10

The method of Example 9, where for each of the responses, the target endpoint information comprises at least one associated endpoint address corresponding to a valid endpoint capable of handling authentication attempts issued for associated ones of the invalid email identities.

EXAMPLE 11

The method of Examples 9-10, where responsive to authentication attempts for the invalid email identities issued to endpoints indicated by the target endpoint information, the endpoints prompt for login credentials related to the invalid email identities.

EXAMPLE 12

The method of Examples 9-11, further comprising determining the responses that conceal the validity of the email identities by at least processing content of the invalid email identities with an endpoint obfuscation process to reduce potential identification of the validity of the email identities while maintaining consistent responses to the requests among each individual invalid email identity.

EXAMPLE 13

The method of Examples 9-12, where the endpoint information relates to a hybrid email system comprising a distributed email system and at least one on-premises email system, and further comprising determining the responses that conceal the validity of the email identities by at least processing the invalid email identities with at least an obfuscation function to identify the target endpoint information from among the distributed email system and the at least one on-premises email system. Based at least on the obfuscation function indicating the distributed email system, the method includes determining associated responses that indicate an endpoint address for the distributed email system. Based at least on the obfuscation function indicating the at least one on-premises email system, the method includes determining associated responses that indicate the at least one on-premises email system.

EXAMPLE 14

The method of Examples 9-13, further comprising, based at least on the at least one on-premises email system comprising a plurality of on-premises email systems, processing the invalid email identities with at least a further obfuscation function to distribute the target endpoint information among the plurality of on-premises email systems.

EXAMPLE 15

The method of Examples 9-14, where the endpoint information relates to an email system comprising a plurality of on-premises email systems, and further comprising determining the responses that obfuscate the validity of the email identities by at least processing the invalid email identities with at least a obfuscation function to distribute the target endpoint information from among the plurality of on-premises email systems.

EXAMPLE 16

The method of Examples 9-15, where the endpoint information relates to an email system comprising a distributed email system, and further comprising determining the responses that conceal the validity of the email identities by at least providing the target endpoint information from among the distributed email system responsive to the requests indicating the invalid email identities.

EXAMPLE 17

A computing apparatus comprising one or more computer readable storage media, a processing system operatively coupled with the one or more computer readable storage media, and program instructions stored on the one or more computer readable storage media. The program instructions, when executed by the processing system, direct the processing system to at least receive requests for mailbox endpoint identities corresponding to invalid email addresses, and provide obfuscated responses that conceal validity of the invalid email addresses by returning identities of mailbox endpoints derived based at least on the invalid email addresses, where the identities of mailbox endpoints relate to target endpoints capable of handling authentication attempts for ones of the invalid email addresses.

EXAMPLE 18

The computing apparatus of Example 17, where the endpoint information relates to an email system comprising a distributed email service and an on-premises email service comprising a plurality of on-premises endpoints, and comprising further program instructions, when executed by the processing system, direct the processing system to at least determine the obfuscated responses that conceal the validity of the invalid email addresses by processing each of the invalid email addresses with at least a hash function that produces a selection among the distributed email service and the on-premises email service.

EXAMPLE 19

The computing apparatus of Examples 17-18, comprising further program instructions, when executed by the processing system, direct the processing system to at least, based at least on the hash function indicating the distributed email service, determine associated obfuscated responses that indicate at least a mailbox endpoint address for the distributed email service, and based at least on the hash function indicating the on-premises email service, determine further associated obfuscated responses spread among the plurality of on-premises endpoints.

EXAMPLE 20

The computing apparatus of Examples 17-19, comprising further program instructions, when executed by the processing system, direct the processing system to at least determine the further associated obfuscated responses spread among the plurality of on-premises endpoints by processing each of the invalid email addresses with at least a further hash function that produces a selection among the plurality of on-premises endpoints.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A computing apparatus comprising:
    one or more computer readable storage media;
    a processing system operatively coupled with the one or more computer readable storage media; and
    program instructions stored on the one or more computer readable storage media, that when executed by the processing system, direct the processing system to at least:
    receive requests for endpoint information that correspond to email identities included in the requests;
    for ones of the requests that indicate invalid email identities, determine responses that conceal validity of the invalid email identities by deriving target endpoint information based at least on the invalid email identities; and
    provide the responses that indicate the target endpoint information.

2. The computing apparatus of claim 1, wherein for each of the responses, the target endpoint information comprises at least one associated endpoint address corresponding to a valid endpoint capable of handling authentication attempts issued for associated ones of the invalid email identities.

3. The computing apparatus of claim 1, wherein responsive to authentication attempts for the invalid email identities issued to endpoints indicated by the target endpoint information, the endpoints prompt for login credentials related to the invalid email identities.

4. The computing apparatus of claim 1, comprising further program instructions, when executed by the processing system, direct the processing system to at least:
determine the responses that conceal the validity of the email identities by at least processing content of the invalid email identities with an endpoint obfuscation process to reduce potential identification of the validity of the email identities while maintaining consistent responses to the requests among each individual invalid email identity.

5. The computing apparatus of claim 1, wherein the endpoint information relates to a hybrid email system comprising a distributed email system and at least one on-premises email system; and
comprising further program instructions, when executed by the processing system, direct the processing system to at least:
determine the responses that conceal the validity of the email identities by at least processing the invalid email identities with at least an obfuscation function to identify the target endpoint information from among the distributed email system and the at least one on-premises email system;
based at least on the obfuscation function indicating the distributed email system, determine associated responses that indicate an endpoint address for the distributed email system; and
based at least on the obfuscation function indicating the at least one on-premises email system, determine associated responses that indicate the at least one on-premises email system.

6. The computing apparatus of claim 5, comprising further program instructions, when executed by the processing system, direct the processing system to at least:
based at least on the at least one on-premises email system comprising a plurality of on-premises email systems, processing the invalid email identities with at least a further obfuscation function to distribute the target endpoint information among the plurality of on-premises email systems.

7. The computing apparatus of claim 1, wherein the endpoint information relates to an email system comprising a plurality of on-premises email systems; and
comprising further program instructions, when executed by the processing system, direct the processing system to at least:
determine the responses that conceal the validity of the email identities by at least processing the invalid email identities with at least an obfuscation function to distribute the target endpoint information among the plurality of on-premises email systems.

8. The computing apparatus of claim 1, wherein the endpoint information relates to an email system comprising a distributed email system; and
comprising further program instructions, when executed by the processing system, direct the processing system to at least:
determine the responses that obfuscate the validity of the email identities by at least providing the valid endpoint information from among the distributed email system responsive to the requests indicating the invalid email identities.

9. A method of operating an email service, the method comprising:

receiving requests for endpoint information that correspond to email identities included in the requests;
for ones of the requests that indicate invalid email identities, determining responses that conceal validity of the invalid email identities by deriving target endpoint information based at least on the invalid email identities; and
providing the responses that indicate the target endpoint information.

10. The method of claim 9, wherein for each of the responses, the target endpoint information comprises at least one associated endpoint address corresponding to a valid endpoint capable of handling authentication attempts issued for associated ones of the invalid email identities.

11. The method of claim 9, wherein responsive to authentication attempts for the invalid email identities issued to endpoints indicated by the target endpoint information, the endpoints prompt for login credentials related to the invalid email identities.

12. The method of claim 9, further comprising:
determining the responses that conceal the validity of the email identities by at least processing content of the invalid email identities with an endpoint obfuscation process to reduce potential identification of the validity of the email identities while maintaining consistent responses to the requests among each individual invalid email identity.

13. The method of claim 9, wherein the endpoint information relates to a hybrid email system comprising a distributed email system and at least one on-premises email system; and
further comprising:
determining the responses that conceal the validity of the email identities by at least processing the invalid email identities with at least an obfuscation function to identify the target endpoint information from among the distributed email system and the at least one on-premises email system;
based at least on the obfuscation function indicating the distributed email system, determining associated responses that indicate an endpoint address for the distributed email system; and
based at least on the obfuscation function indicating the at least one on-premises email system, determining associated responses that indicate the at least one on-premises email system.

14. The method of claim 13, further comprising:
based at least on the at least one on-premises email system comprising a plurality of on-premises email systems, processing the invalid email identities with at least a further obfuscation function to distribute the target endpoint information among the plurality of on-premises email systems.

15. The method of claim 9, wherein the endpoint information relates to an email system comprising a plurality of on-premises email systems; and
further comprising:
determining the responses that obfuscate the validity of the email identities by at least processing the invalid email identities with at least a obfuscation function to distribute the target endpoint information from among the plurality of on-premises email systems.

16. The method of claim 9, wherein the endpoint information relates to an email system comprising a distributed email system; and
further comprising:

determining the responses that conceal the validity of the email identities by at least providing the target endpoint information from among the distributed email system responsive to the requests indicating the invalid email identities.

17. A computing apparatus comprising:

one or more computer readable storage media;

a processing system operatively coupled with the one or more computer readable storage media; and program instructions stored on the one or more computer readable storage media, that when executed by the processing system, direct the processing system to at least:

receive requests for mailbox endpoint identities corresponding to invalid email addresses; and provide obfuscated responses that conceal validity of the invalid email addresses by returning identities of mailbox endpoints derived based at least on the invalid email addresses, wherein the identities of mailbox endpoints relate to target endpoints capable of handling authentication attempts for ones of the invalid email addresses.

18. The computing apparatus of claim 17, wherein the endpoint information relates to an email system comprising a distributed email service and an on-premises email service comprising a plurality of on-premises endpoints; and comprising further program instructions, when executed by the processing system, direct the processing system to at least:

determine the obfuscated responses that conceal the validity of the invalid email addresses by processing each of the invalid email addresses with at least a hash function that produces a selection among the distributed email service and the on-premises email service.

19. The computing apparatus of claim 18, comprising further program instructions, when executed by the processing system, direct the processing system to at least:

based at least on the hash function indicating the distributed email service, determine associated obfuscated responses that indicate at least a mailbox endpoint address for the distributed email service;

based at least on the hash function indicating the on-premises email service, determine further associated obfuscated responses spread among the plurality of on-premises endpoints.

20. The computing apparatus of claim 19, comprising further program instructions, when executed by the processing system, direct the processing system to at least:

determine the further associated obfuscated responses spread among the plurality of on-premises endpoints by processing each of the invalid email addresses with at least a further hash function that produces a selection among the plurality of on-premises endpoints.

* * * * *